United States Patent
Falk

(10) Patent No.: US 10,281,959 B2
(45) Date of Patent: May 7, 2019

(54) TREE COMPUTER KIOSK SYSTEM AND METHOD

(71) Applicant: Ira A Falk, Rancho Santa Fe, CA (US)

(72) Inventor: Ira A Falk, Rancho Santa Fe, CA (US)

( * ) Notice: Subject to any disclaimer, the term of this patent is extended or adjusted under 35 U.S.C. 154(b) by 71 days.

(21) Appl. No.: 15/680,763

(22) Filed: Aug. 18, 2017

(65) Prior Publication Data

US 2017/0344077 A1 Nov. 30, 2017

Related U.S. Application Data

(63) Continuation-in-part of application No. PCT/US2016/018553, filed on Feb. 18, 2016.

(60) Provisional application No. 62/117,866, filed on Feb. 18, 2015.

(51) Int. Cl.
| | | |
|---|---|---|
| G06F 1/18 | (2006.01) | |
| G06F 1/16 | (2006.01) | |
| H04N 5/225 | (2006.01) | |
| H04R 1/02 | (2006.01) | |

(52) U.S. Cl.
CPC ............ *G06F 1/181* (2013.01); *G06F 1/1601* (2013.01); *G06F 1/1632* (2013.01); *G06F 1/182* (2013.01); *G06F 1/183* (2013.01); *H04N 5/2252* (2013.01); *H04R 1/028* (2013.01)

(58) Field of Classification Search
CPC .......... G06F 1/181; G06F 1/182; G06F 1/183; G06F 1/1601
See application file for complete search history.

(56) References Cited

U.S. PATENT DOCUMENTS

| | | |
|---|---|---|
| 3,144,375 A | 8/1964 | Day |
| 3,735,117 A | 5/1973 | Hunt |
| 3,928,689 A | 12/1975 | Alan |
| 4,109,345 A | 8/1978 | Sargent |
| 4,291,075 A | 9/1981 | Puleo |
| 4,496,615 A | 1/1985 | Huang |
| 4,855,167 A | 8/1989 | Biehl |
| 5,085,900 A | 2/1992 | Hamlett |
| 5,213,855 A | 5/1993 | Buxton |
| 5,611,176 A | 3/1997 | Juengert |
| 5,787,649 A | 8/1998 | Popowych |

(Continued)

FOREIGN PATENT DOCUMENTS

| | | | |
|---|---|---|---|
| JP | 2001-230433 A | | 8/2001 |
| JP | 2001230433 A | * | 8/2001 |

OTHER PUBLICATIONS

Tree Stump Speaker; SmartHome; URL: http://www.smarthome.com/tree-stump-stereo-speader-125w.html; retrieved Oct. 6, 2014.

(Continued)

*Primary Examiner* — Nidhi Thaker
(74) *Attorney, Agent, or Firm* — Connie R. Masters

(57) ABSTRACT

A tree computer kiosk is provided that includes a tree-shaped housing having a trunk and at least one limb and limb stub, where the limb stub is configured to accommodate a display screen. The tree-shaped housing accommodates a computer system including a processor and at least one electronic component. A power supply provides power to the computer processor and other electronic components. The tree-shaped housing includes mounting and mechanisms for securing one or more speakers, cameras, and display screens.

17 Claims, 17 Drawing Sheets

(56) References Cited

U.S. PATENT DOCUMENTS

| | | | | |
|---|---|---|---|---|
| 6,289,326 | B1* | 9/2001 | LaFleur | A47B 81/065 |
| | | | | 312/258 |
| 6,343,440 | B1 | 2/2002 | Ayers | |
| 6,646,863 | B1* | 11/2003 | White | G06F 1/1601 |
| | | | | 361/679.2 |
| D497,569 | S | 10/2004 | Elder | |
| 7,128,954 | B2 | 10/2006 | Tsai | |
| 7,895,783 | B1* | 3/2011 | Espejo | G09F 15/00 |
| | | | | 248/121 |
| 8,116,081 | B2* | 2/2012 | Crick, Jr. | G09F 27/00 |
| | | | | 361/679.23 |
| 8,298,633 | B1 | 10/2012 | Chen | |
| 8,454,186 | B2 | 6/2013 | Chen | |
| 10,048,746 | B2* | 8/2018 | Gonzalez Solis | G06F 3/01 |
| 2009/0113116 | A1* | 4/2009 | Thompson | G06F 13/385 |
| | | | | 711/103 |
| 2013/0171376 | A1 | 7/2013 | Urban | |
| 2013/0301245 | A1 | 11/2013 | Chen | |
| 2017/0017263 | A1* | 1/2017 | Birgeoglu | G06F 1/1601 |

OTHER PUBLICATIONS

Growin Up Tree Stump Speaker review from TrendHunter; URL: http://www.trendhunter.com/trends/growin-up-speaker-system; retrieved Oct. 6, 2014.

Thomas Laenner Tree Stump Speaker review from UberGizmo URL: http://www.ubergizmo.com/2011/08/nature-inspired-tree-stump-speaker/; retrieved Oct. 6, 2014.

Intel Ultrabook Tree at CES 2013 as reported by InsideScoop; URL: http://scoopintel.com/ces-ultrabook-tree-intel-tablets-smartphones-oh-my/.; retrieved Oct. 6, 2014.

Point2Explore Custom Kiosks; URL: http://museum.point2explore.com/kiosks-and-hardware/custom-kiosks-exhibits.aspx; retrieved Oct. 6, 2014.

Xd Design Solar Charger Tree sold by Amazon.com; URL: http://www.amazon.com/Design-Charger-Samsung-Android-Usb-charged/dp/B00HULTIBE#customerReviews; retrieved Oct. 6, 2014.

Multipe iPad Kiosk Array reported by nClosures; URL: http://www.nclosures.com/multiple-ipad-kiosk-array/; retrieved Oct. 6, 2014.

Apple Computer Kiosk by Flux Design; URL: http://www.thinkflux.com/apple.html; retrieved Oct. 6, 2014.

Rustic Kiosk Treee Screen by Rustic Furniture by Don McAulay Sr. & Jr.; URL: http://www.customrusticfurniture.com/Rustic-Interiors/item3141.html; retrieved Oct. 6, 2014.

Written Opinion of the International Search Authority dated Oct. 5, 2016; International Application No. PCT/US2016/018553; International Filing Date Feb. 18, 2016.

International Search Report of the International Search Authority dated Oct. 5, 2016; International Application No. PCT/US2016/018553; International Filing Date Feb. 18, 2016.

* cited by examiner

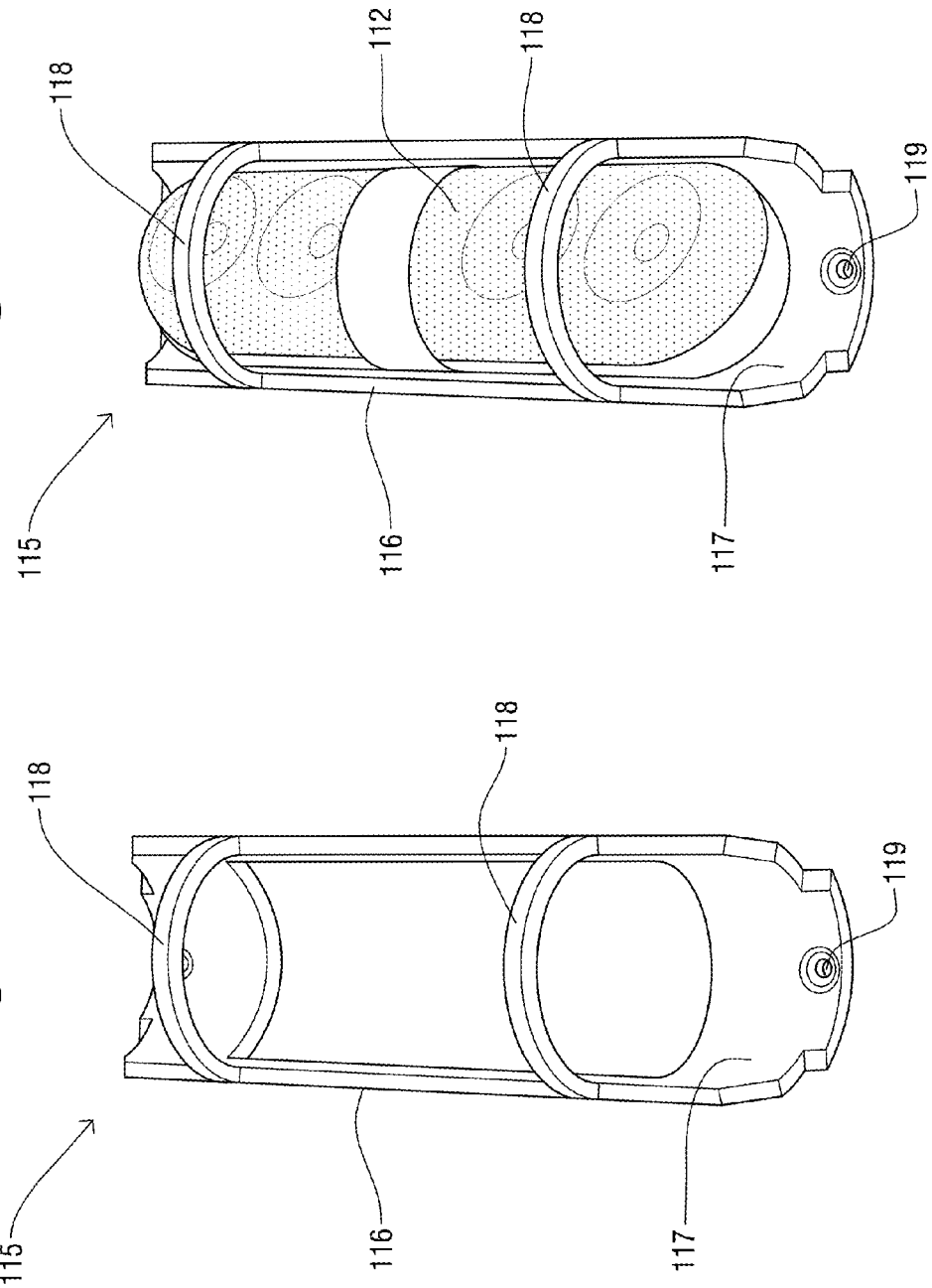

TREE COMPUTER KIOSK SYSTEM AND METHOD

CROSS-REFERENCE TO RELATED APPLICATIONS

The present application is a bypass continuation-in-part application of currently pending international application No. PCT/US2016/018553 having an international filing date of Feb. 18, 2016 and designating the United States, the international application claiming a priority date of Feb. 18, 2015 based upon prior-filed U.S. provisional patent application No. 62/117,866, the entire contents of the aforesaid international application and the aforesaid United States provisional patent being incorporated herein by reference.

FIELD OF INVENTION

This invention relates generally to a computer kiosk system and, more particularly, to a tree-shaped housing and mounting arrangements for a computer system including a processor, components and peripherals.

BACKGROUND OF THE INVENTION

A conventional electronic kiosk is a utilitarian, box-like structure housing a computing device having a display and a means of accepting user input. Generally, electronic kiosks have a user interface (which may include manual buttons and/or a touchscreen) and an output system (which may include a visual display or auditory output). Often, electronic kiosks utilize custom kiosk software that prevents users from accessing system functions while providing various self-service functions to the user, such as providing information, marketing products, allowing Internet access, dispensing products, allowing self-check in, performing transactions, or the like. These kiosks have become quite popular as an efficient and economical alternative to traditional human-to-human customer services. Summit Research Associates reported that there were 1.2 million kiosks in service in North America in 2009.

Although existing kiosks are typically placed in public locations, they are often physically large, bulky, unattractive machine systems that do not enhance, or even blend into, their environment. Quite often, their boring, utilitarian structure detracts from the desired appearance of their surroundings.

Accordingly, there is a need for an interesting, aesthetically pleasing computer kiosk that adds to the look of its environment, while also enabling, or improving upon, the functionality of a standard electronic kiosk.

BRIEF SUMMARY OF THE INVENTION

The present invention is directed to a tree computer kiosk system and method that includes a tree-shaped housing that accommodates a computer system including a processor and any of a variety of electronic components and peripherals. The tree-shaped housing includes mounting mechanisms for securing display screens, speakers and cameras.

The tree computer kiosk supports the various components in a manner that permits efficient utilization of the kiosk by users, while integrating the various components with the various tree elements in interesting yet functional ways.

An object of the present invention is to provide a tree-shaped computer kiosk.

An additional object of the present invention is to provide suitable mountings for the electronic components within the tree-shaped housing.

A further object is to provide a tree computer kiosk that integrates the mountings for the computer system components with the various elements of the tree.

These and other objects, features, and advantages of the present invention will become more readily apparent from the attached drawings and from the detailed description of the preferred embodiments which follow.

BRIEF DESCRIPTION OF THE SEVERAL VIEWS OF THE DRAWINGS

The preferred embodiments of the invention will hereinafter be described in conjunction with the appended drawings, provided to illustrate and not to limit the invention, where like designations denote like elements.

FIG. 13 is a perspective view of a speaker holder of one aspect of the present invention.

FIG. 14 is a perspective view of a speaker installed in the speaker holder of one aspect of the present invention.

Like reference numerals refer to like parts throughout the several views of the drawings.

DETAILED DESCRIPTION OF THE INVENTION

Shown throughout the figures, the present invention is directed toward a tree-shaped computer kiosk system and method, which integrates a computer system, including a processor and any of a variety of electronic components and peripherals, which may be referred to generally as "electronic components." Various natural tree elements, such as bark, knotholes, limbs, leaves, stumps, limb stubs and branches are used to camouflage, conceal, obscure, and/or surround electronic components of the computer system or are used to favorably position the electronic components.

Particularly, one or more display screens may be advantageously supported, such as by a tree stub, at a suitable angle and height to allow access to the anticipated users of the tree kiosk.

Figure 1:
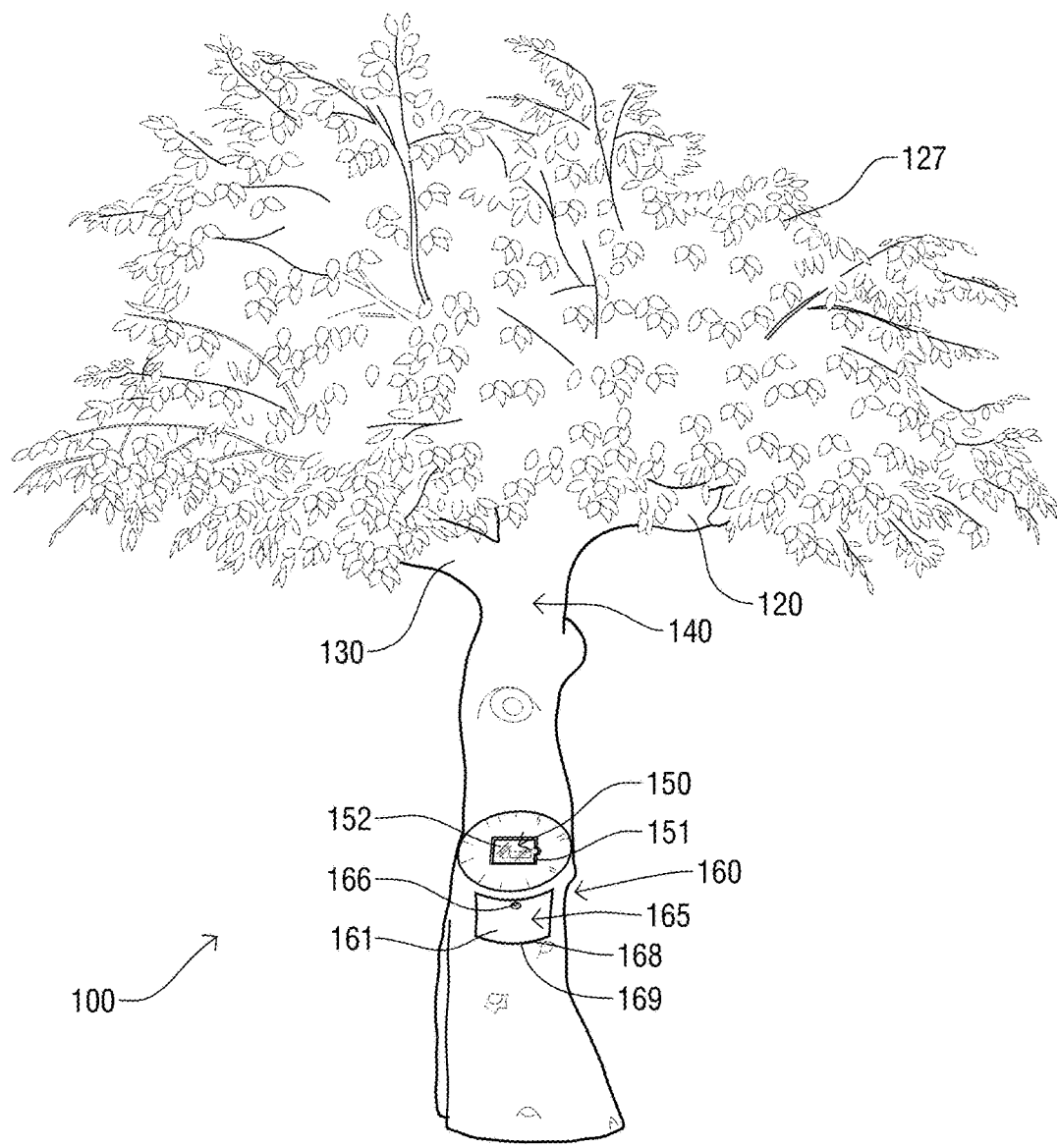
FIG. 1 is a front view of an embodiment of the tree computer kiosk system of the present invention.

Referring now to FIG. 1, a tree computer kiosk system, shown generally as reference number 100, is illustrated in accordance with an embodiment of the present invention. As shown, the tree computer kiosk system 100 comprises an external tree-shaped housing 101 including a trunk 140, a limb stub 160 supporting a display screen (preferably a touchscreen, and preferably integrated as a tablet) 151, limbs 130, branches 120, and artificial leaves 127. The limb stub 160 has an access door 165 to allow access to, removal of, and installation of the tablet 150. The artificial leaves 127 are artificial leaves that are In FIG. 1, the branches and artificial leaves 127 of the upper area of the tree-shaped housing 101 obscure some tree-mimicking housing elements that can be seen in the close-up view of the same upper area at a slightly different angle in FIG. 9; these are the speaker output holes 131 for speaker 112 (FIG. 14) and the edges 122 of an artificial knothole 124 that provides an exterior viewing opening for a camera lens 185.

Figure 2:
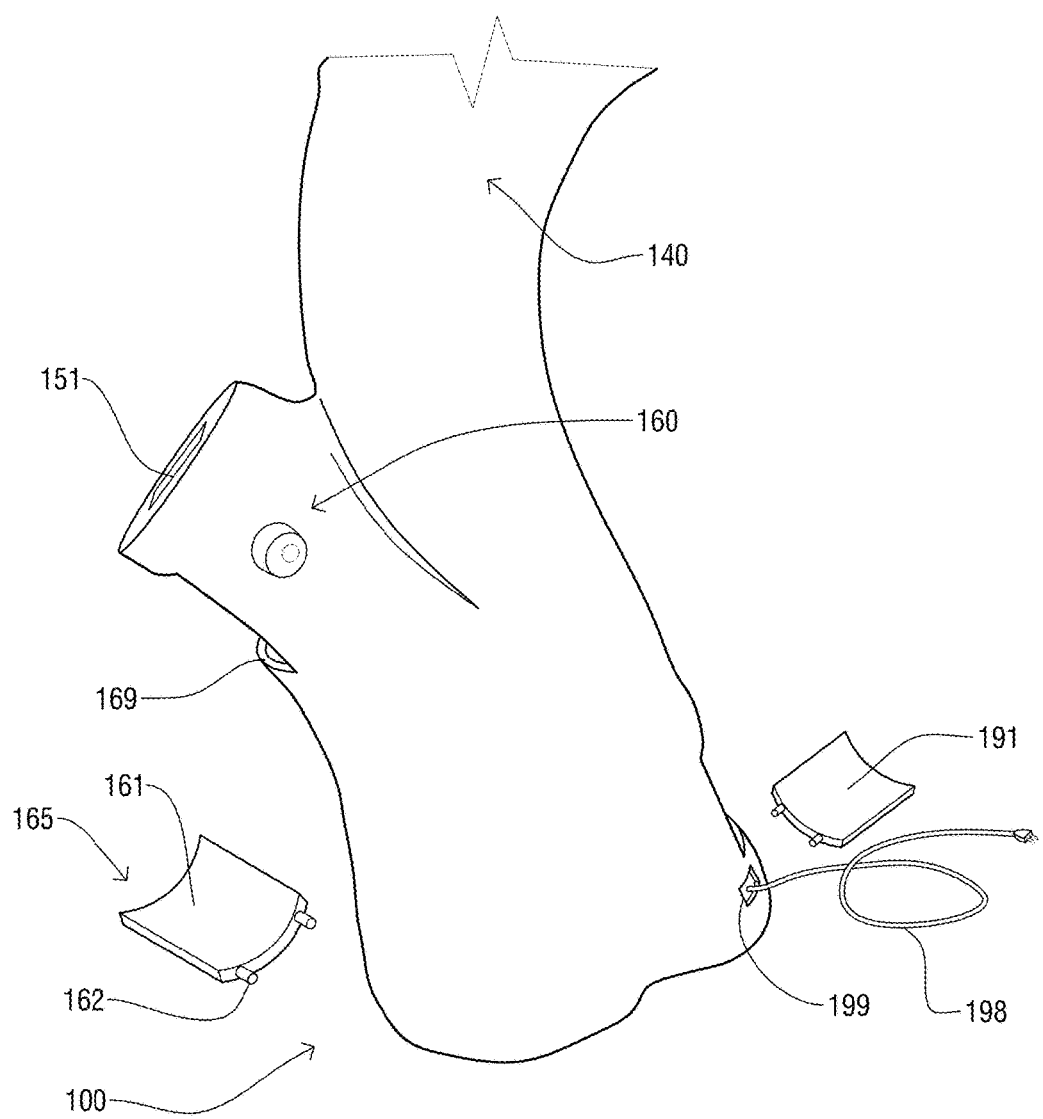
FIG. 2 is a partial right side view of an embodiment of the tree computer kiosk system of the present invention.
Figure 3:
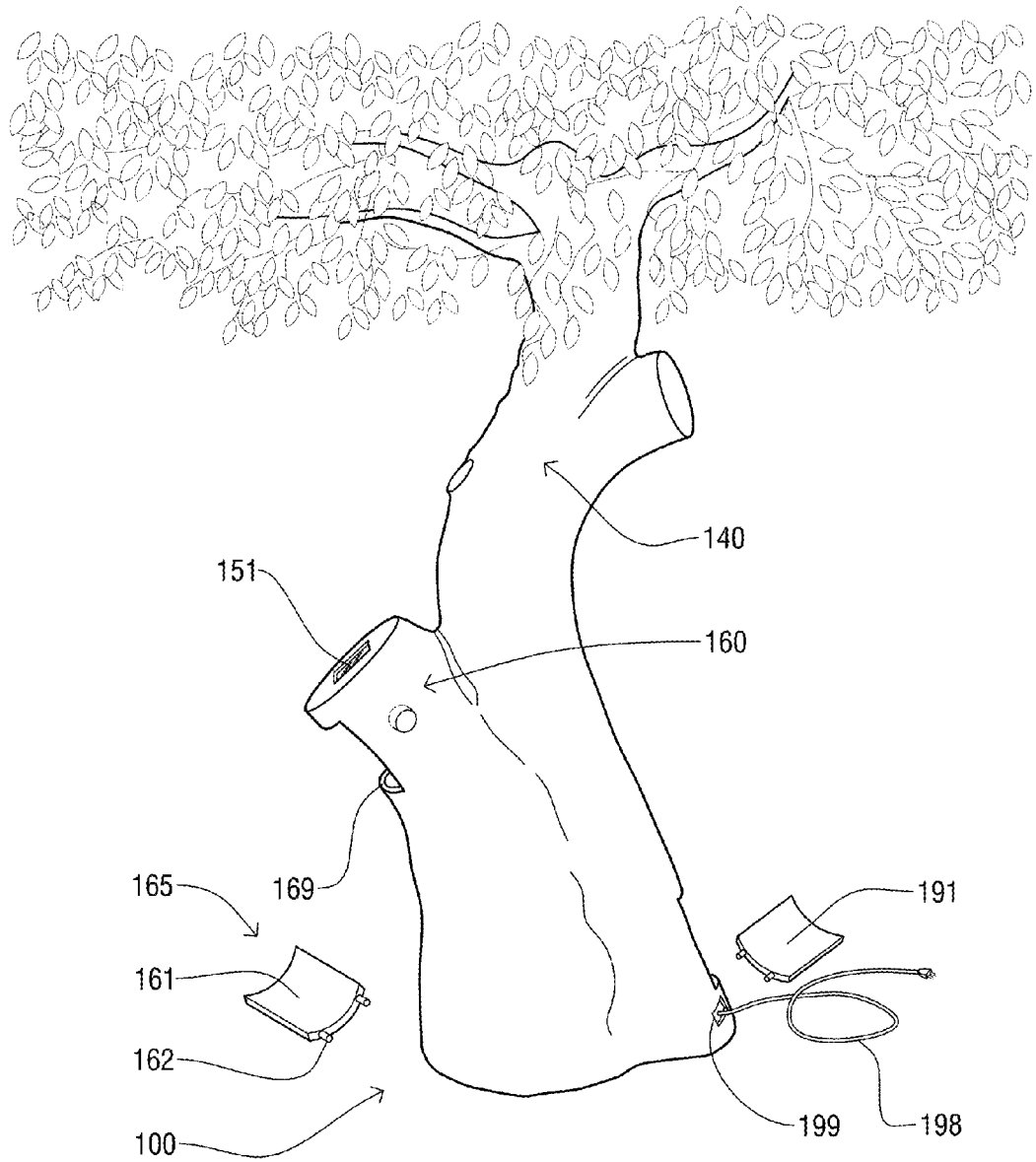
FIG. 3 is a partial right side view of an embodiment of the tree computer kiosk system of the present invention.

FIGS. 2-3 show right side views (from two slightly different angles) of the limb stub 160 with the stub access door 165 removed and with the trunk access door 191 removed. The stub door frame 169 defines the outer edges of the stub access hole. Disposed at or near this stub door frame 169 is a door frame attachment mechanism. The door frame attachment mechanism at the door frame bottom 169 (FIG. 6) attaches to the corresponding access door attachment mechanism disposed at the bottom of stub door frame 169, thereby providing a means to connect the access door 165 to the door frame 169. Any standard mechanism may be used, either a mechanism that allows full removal of the access door (as illustrated) or a hinged mechanism that merely lets the access door swing downward and out of the way.

Also seen in FIGS. 2-3 are the electrical power plug and cord, which are a part of the power wiring 198 that is connected to a power supply and is operative to provide power to the powered electronic components housed within the tree-shaped housing 101. The plug may be plugged into a wall outlet with the cord of power wiring 198 entering the interior of the trunk through an opening 199 in the trunk 140 or may have a plug that plugs into a socket in opening 199. The power plug and cord allow power to be supplied via power wiring 198 (which may be routed through internal conduits 174 (FIG. 16) to the area of use) to the components and peripherals that require AC power. Even some components that may utilize batteries may need the provided AC power for recharging. Optionally, a larger battery may serve as a power source for multiple ones of the enclosed processor, peripherals and electronic components. The larger battery may be removable for charging or may be charged by means of external AC power, such as via the plug and cord shown.

Figure 4:
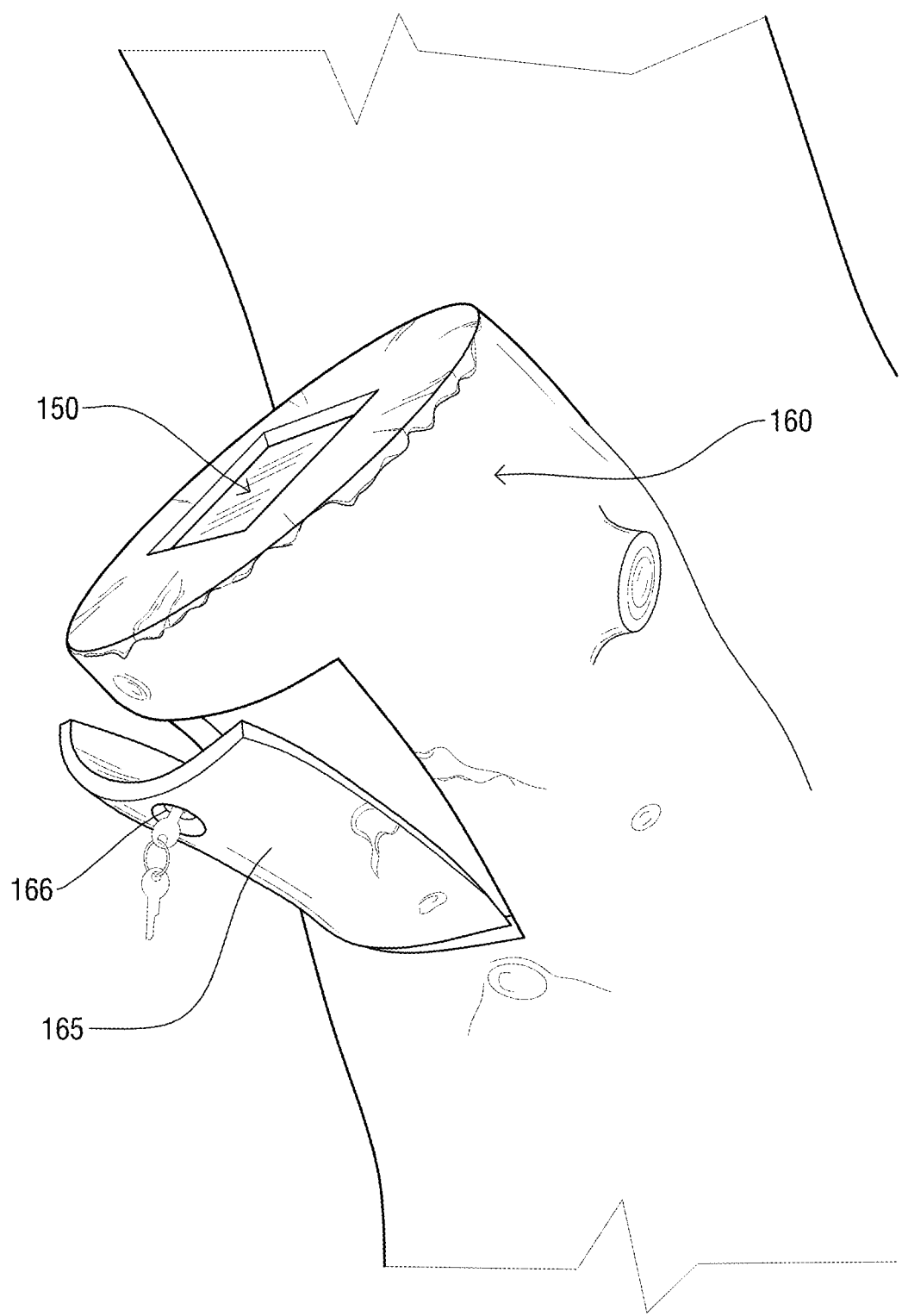
FIG. 4 is a partial right front side perspective view of an embodiment of the tree computer kiosk system of the present invention.

FIG. 4 is a detail view of the limb stub 160 supporting tablet 150 with the stub access door 165 partially open. The stub access door 165 is finished at least externally with a stub skin 161 (a portion of the external decorative skin 179) that forms a part of, and matches or coordinates with, the external decorative skin 179. Optionally, the interior of the stub access door 165 may also have an exterior surface skin 161. Similarly, the trunk access door 191 has at least an external skin that matches or coordinates with the decorative skin 179. The stub access door 165, trunk access door 191, and speaker access door 125 (described below) imitate natural bark features, so when closed are substantially unnoticeable.

The stub access door 165 is preferably configured with a stub door lock 166, the locking of which restricts access to the valuable electronic components secured within the tree-shaped housing 101. Similarly, a second locking mechanism is preferably included to secure the trunk access door 191 (FIGS. 2-3). And, optionally, a third locking mechanism may secure the speaker access door 125.

The design of the limb stub 160 takes advantage of a shape seen in nature to elegantly incorporate the tablet 150 with touch-type display screen 151 into a convenient operating position for the user. This is in contrast to a conventional boxy, vertical kiosk, which often provides an awkward platform extending outwardly beyond the base for user convenience—which is merely a functional necessity and does not add to the attractiveness of the kiosk.

The limb stub 160 has an upper surface that is at a suitable elevation and angle for supporting the tablet 150 at an appropriate height and slant to accommodate convenient, easy access to the touch-type display screen 151 by the user. The distance from the floor to the top of the upper surface may be larger if the user is anticipated to be standing to use the tree computer kiosk system 100 or may be shorter if the user is anticipated to be sitting (such as to provide wheelchair access) or if the user is anticipated to be a child.

The trunk 140 may be secured to a base (not shown) or to a structure (not shown) within the flooring of the location of use of the tree computer kiosk system 100. The trunk 140 may optionally be weighted to provide extra stability.

Figure 5:
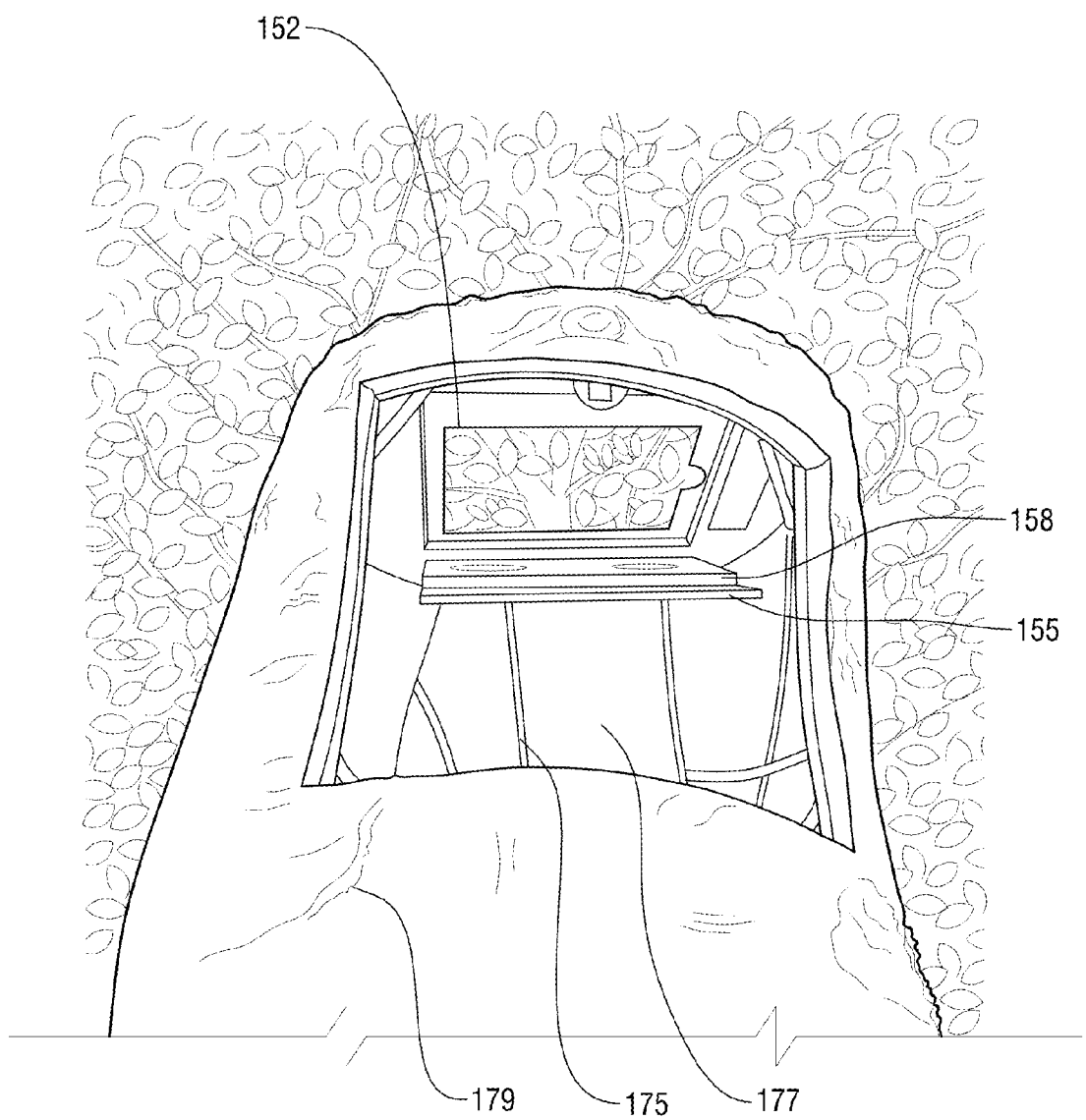
FIG. 5 is an upward-looking partial front view of a tree stub portion of the tree-shaped housing aspect of the present invention with the door removed to show the interior tablet support.
Figure 6:
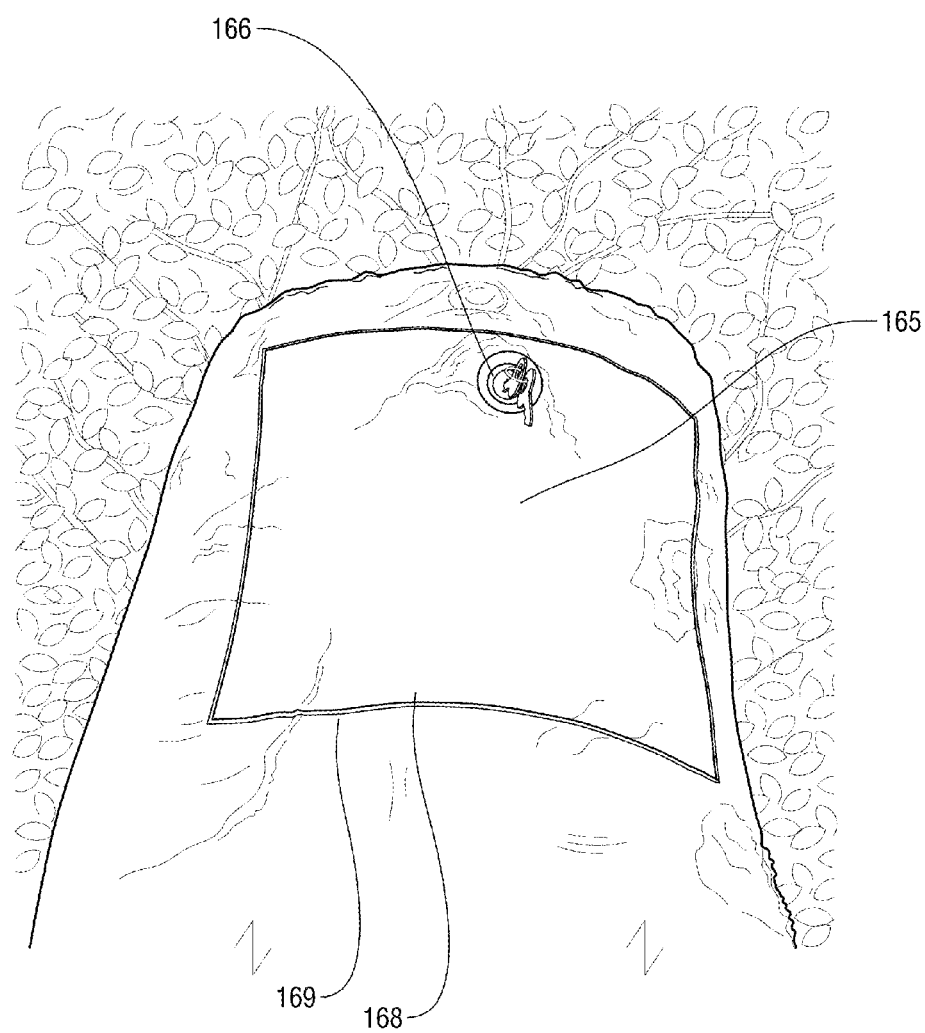
FIG. 6 is the view of FIG. 5 with the door in place.
Figure 7:
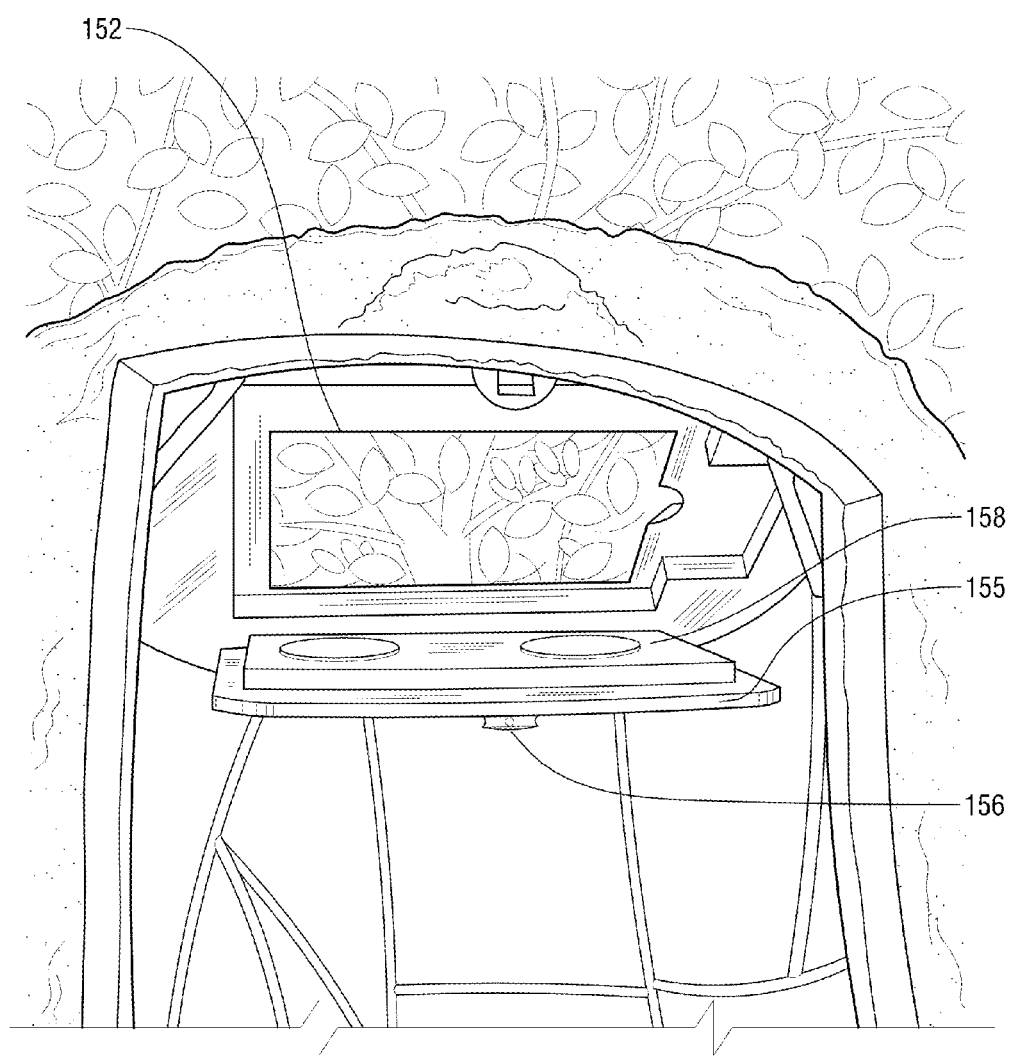
FIG. 7 is an upward-looking partial front view of a tree stub portion of the tree-shaped housing of one aspect of the present invention showing the interior tablet support and cushion configured to receive a tablet computer.
Figure 8:
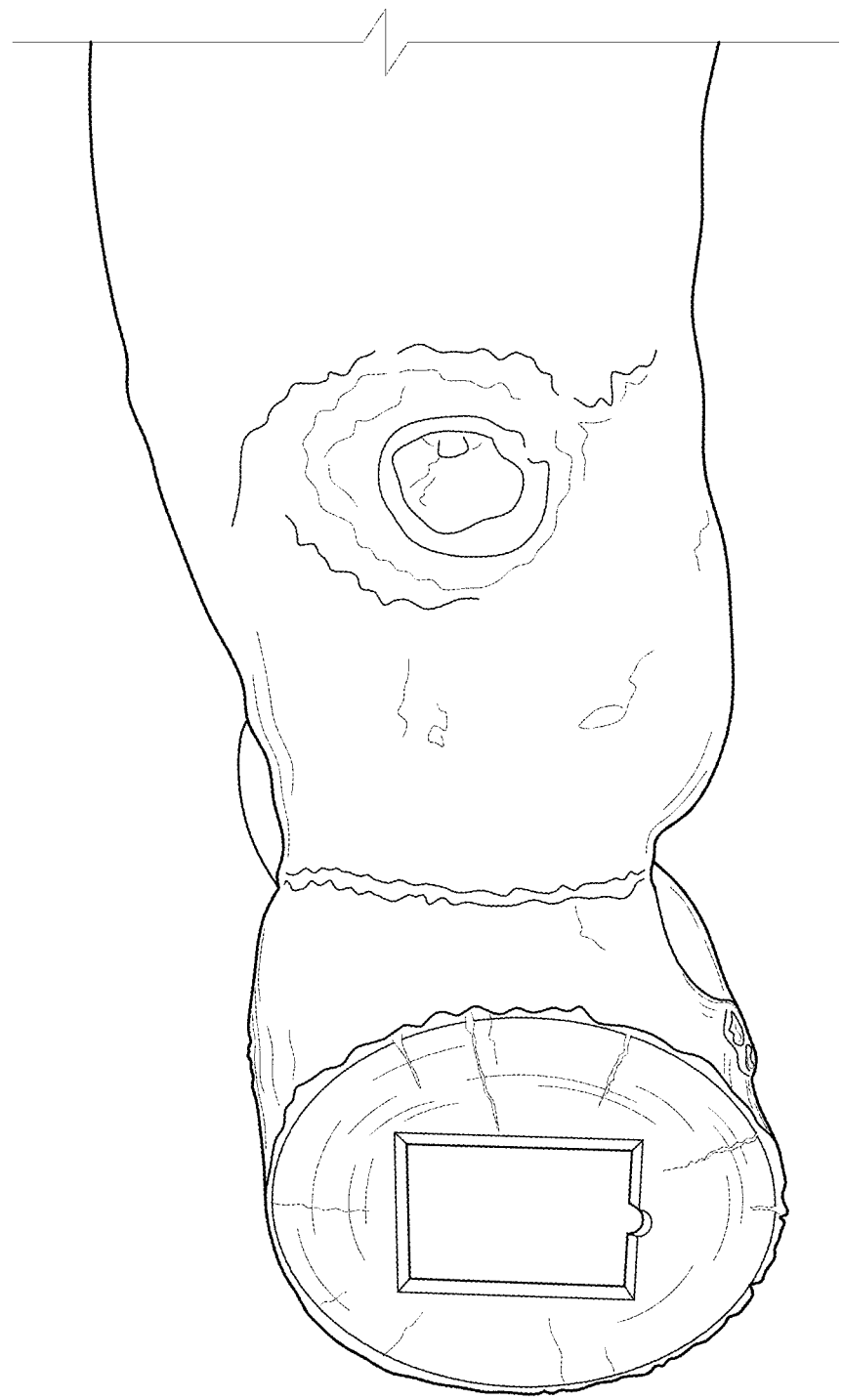
FIG. 8 is a downward-looking view of a portion of the tree-shaped housing of one aspect of the present invention with a tablet computer inserted into the stub portion.

FIGS. 5 to 7 illustrate an exemplary means to support the tablet 150. In this first tablet support aspect, FIGS. 5 and 7 are views looking upwardly into the stub access door 165 allowing viewing of the hinged tablet support 155 and the optional resilient cushion 158. The hinged tablet support 155 holds the installed tablet 150 (FIGS. 1, 4) in a viewable position flush within the display screen/tablet hole frame 152, which defines the edges of an open hole through which the tablet is viewed. The cushion 158 provides a resilient base upon which the tablet may be directly positioned; the resiliency may allow the tablet 150 to sink slightly into the cushion 158, thereby securing the tablet 150 in the desired position without damage. As can be seen in FIG. 7, the hinged tablet support 155 may be slightly larger than the cushion 158, and may engage within an indentation within the interior of the limb stub 160. A tablet support latch 156 is disposed on one side of the hinged tablet support 155; the manual engagement of the latch 156 on the inside of the stub 160 retains the hinged tablet support 155 in position and prevents the tablet support 155 from giving way when pressure is applied to the top of the touchscreen 151 of the tablet 150, which is braced in place by the hinged tablet support 155.

FIG. 5 also allows viewing of exemplary structural components of the tree-shaped housing 101, which illustrate one method of fabricating the tree-shaped housing 101 of the computer kiosk system 100. The materials and production processes of the components of the tree-shaped housing 101 may vary based on considerations of size, environment of use, aesthetic desires, and functional requirements. However, in an exemplary production process, a housing internal support structure 175 is formed into the general shape of the trunk 140, limbs 130, limb stub 160 and various branches of the tree-shaped housing 101. Best seen in FIGS. 16-18, the housing internal support structure 175 may be, for example, a heavy wire mesh mounted on metal rods or a wire frame. Portions of the housing internal support structure 175 may be braced by metal pipe and/or metal reinforcements.

A decorative skin 179 is then applied to the housing internal support structure 175. The design of the decorative skin 179 may vary, with the chosen design based on aesthetic desires or functional requirements. Generally, the decorative skin 179 may be designed to imitate a type of natural bark. However, other textures, grains, veneers, and other natural or artificial designs may also be used; for instance, designs incorporating the style of simulated alligator skin, brick, hair, pebbles, paisleys, plush fabrics, sheets or strands of lights, and the like could optionally be utilized for a desired special effect.

The inside 177 of the decorative skin 179 can be seen through the mesh of the internal support structure 175 in FIG. 5. Though portions of the inside 177 may be decorative in areas that are frequently accessed, there is no requirement for this, so the inside 177 may remain unembellished and generally merely functional.

One exemplary method to form all or a portion of the decorative skin 179 is to use a urethane material, which may be adhered with a methacrylate adhesive onto the housing internal support structure 175, or may be adhered to an intermediary layer of urethane soft foam that is applied to wire mesh that is supported by metal pipes, where the wire mesh and metal pipes form part of the housing internal support structure 175. Until the methacrylate adhesive cures, a plastic film may be used to wrap the glued portions to allow proper curing.

Figure 9:
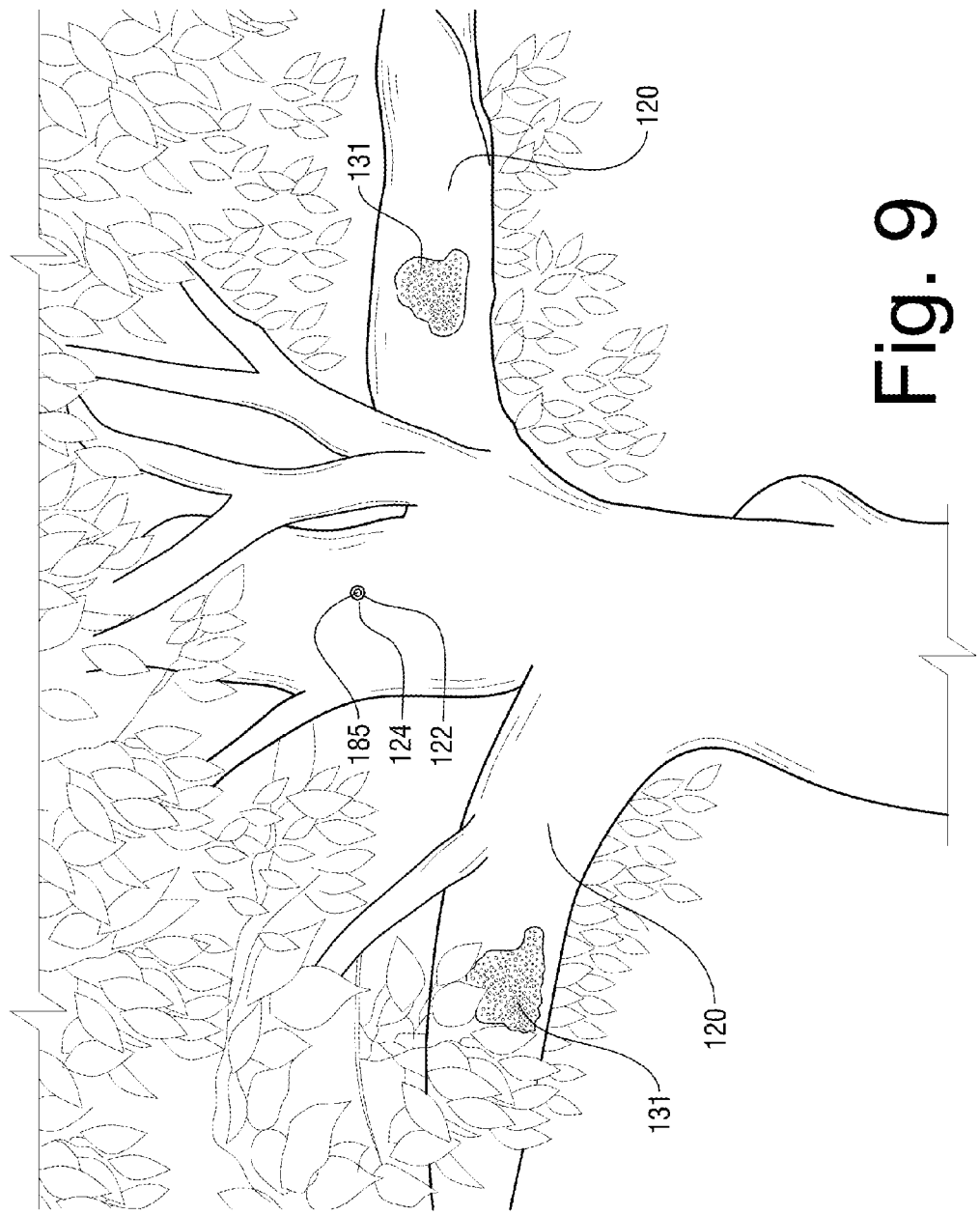
FIG. 9 is a front view of an upper portion of the tree-shaped housing of one aspect of the present invention showing a camera and speaker locations.
Figure 10:
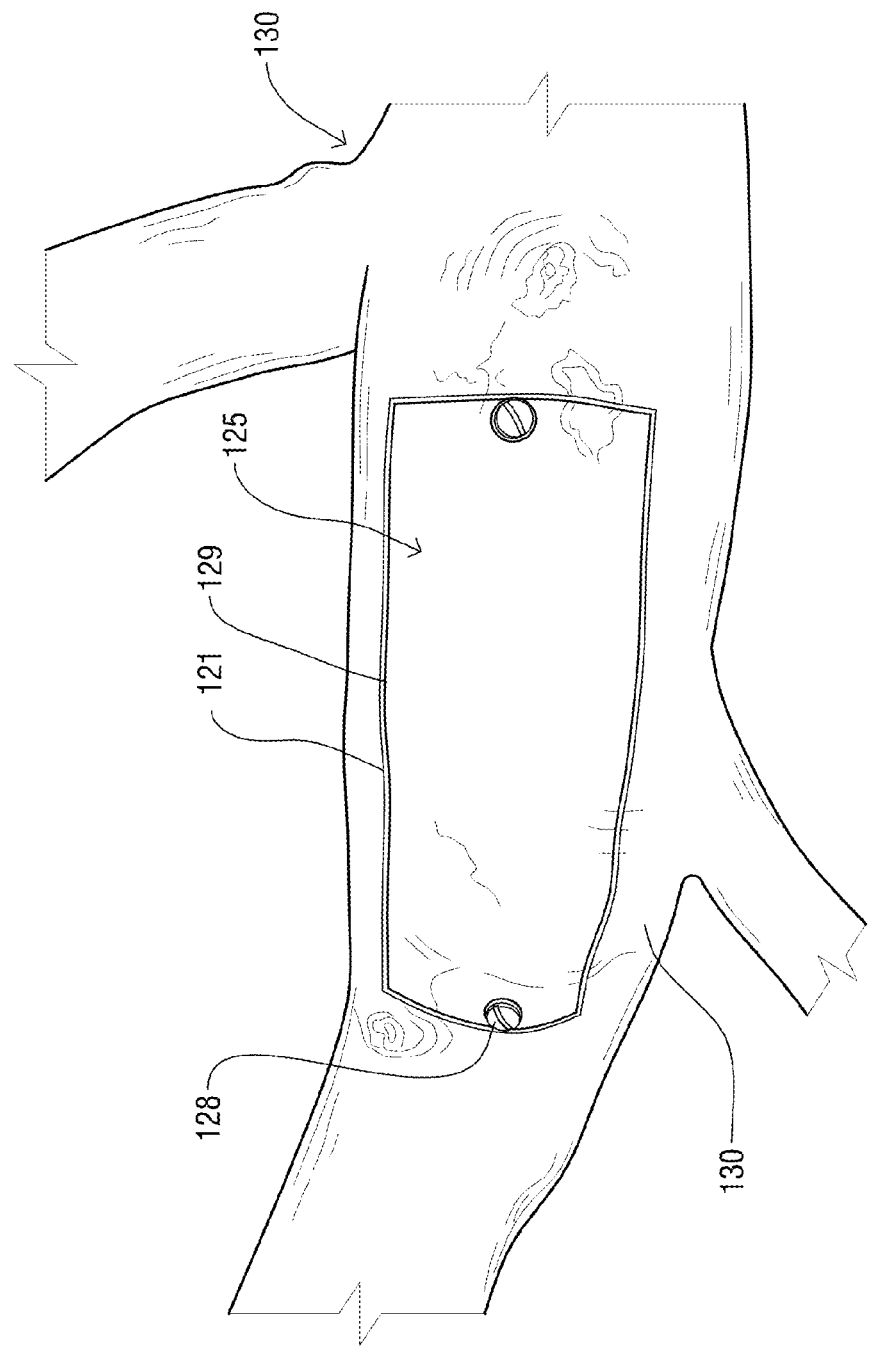
FIG. 10 is a top view of a limb of the tree-shaped housing of one aspect of the present invention showing a speaker location.

FIG. 9 illustrates camouflaged openings or orifices defined by edges 124, 131 extending at least through the external decorative skin 179, that are utilized to give the interior components access to the area (of the room or outdoors) beyond the external decorative skin 179. These camouflaged orifices 124, 131 are generally associated with component-supportive structural elements that support the internal components in the proper position to take advantage of the camouflaged orifices 124, 131. The component-supportive structural elements may include, for example, one or more speaker holders 115, camera supports, and the like.

The natural features of the tree-shaped housing 101 can be used to disguise these external camouflaged orifices 124, 131. For instance, an artificial knothole 124 can be created within the upper portion of the trunk 140, with edges 122 defining an opening behind which the camera system 180 (FIG. 15) is supported via a camera-supportive structural element and through which the lens 185 has an unobstructed view of a portion of the area in front of the tree-shaped housing 101. The camera-supportive structural element may allow tilting of the camera, or the lens 185 itself may be angularly adjustable. After construction of the tree computer kiosk system 100, the camera system 180 or the lens 185 alone may be adjusted so the desired object in front of the tree-shaped housing 101 is within the view of the lens 185.

FIG. 9 also illustrates the utilization of a portion of the bark-like exterior surface of the tree-shaped housing 101 to obscure the holes 131 through which the audio sound from speaker 112 is projected. For example, the holes 131 may be configured and designed to imitate a natural bark attribute, such as a bark abrasion, bark knot hole, or bark scar tissue. Though upon close examination the holes 131 may be identified, the casual observer will not see them.

Figure 11:
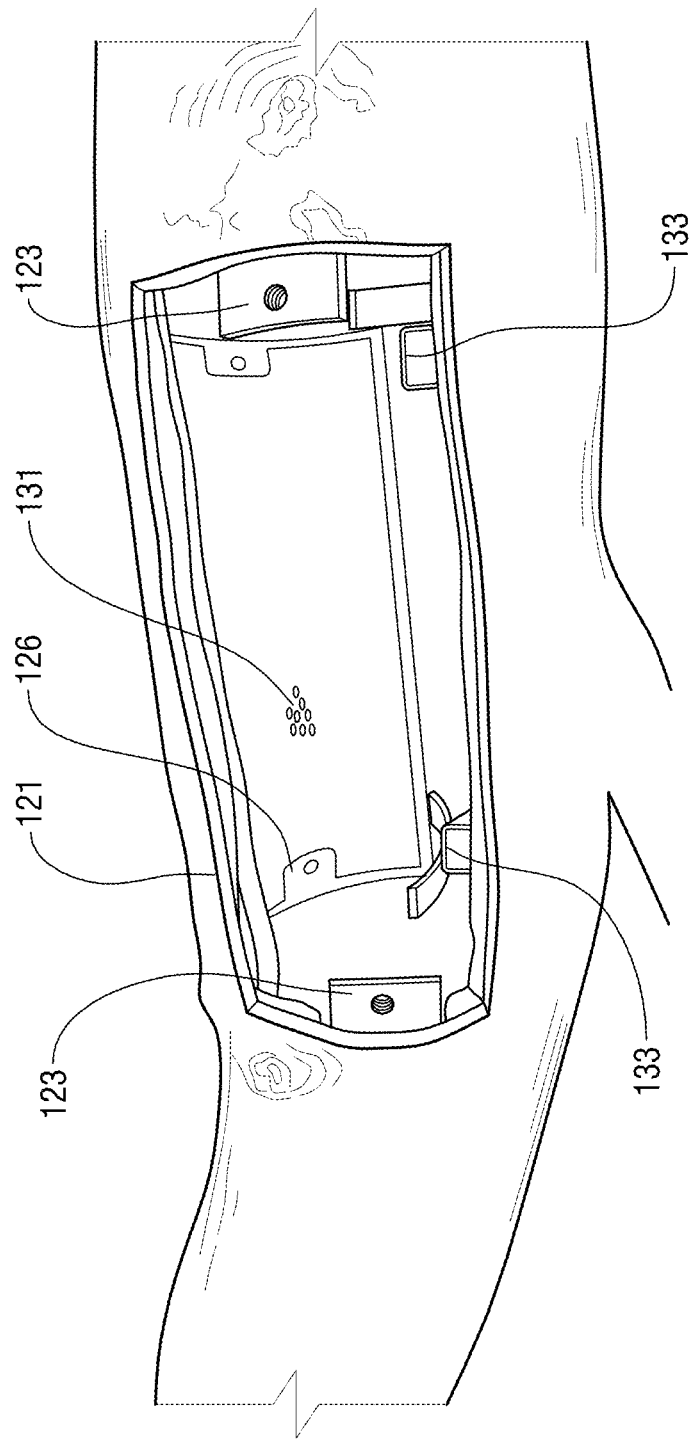
FIG. 11 is a top view of a limb of the tree-shaped housing of one aspect of the present invention showing the speaker location of FIG. 10, but with the speaker access door removed.
Figure 12:
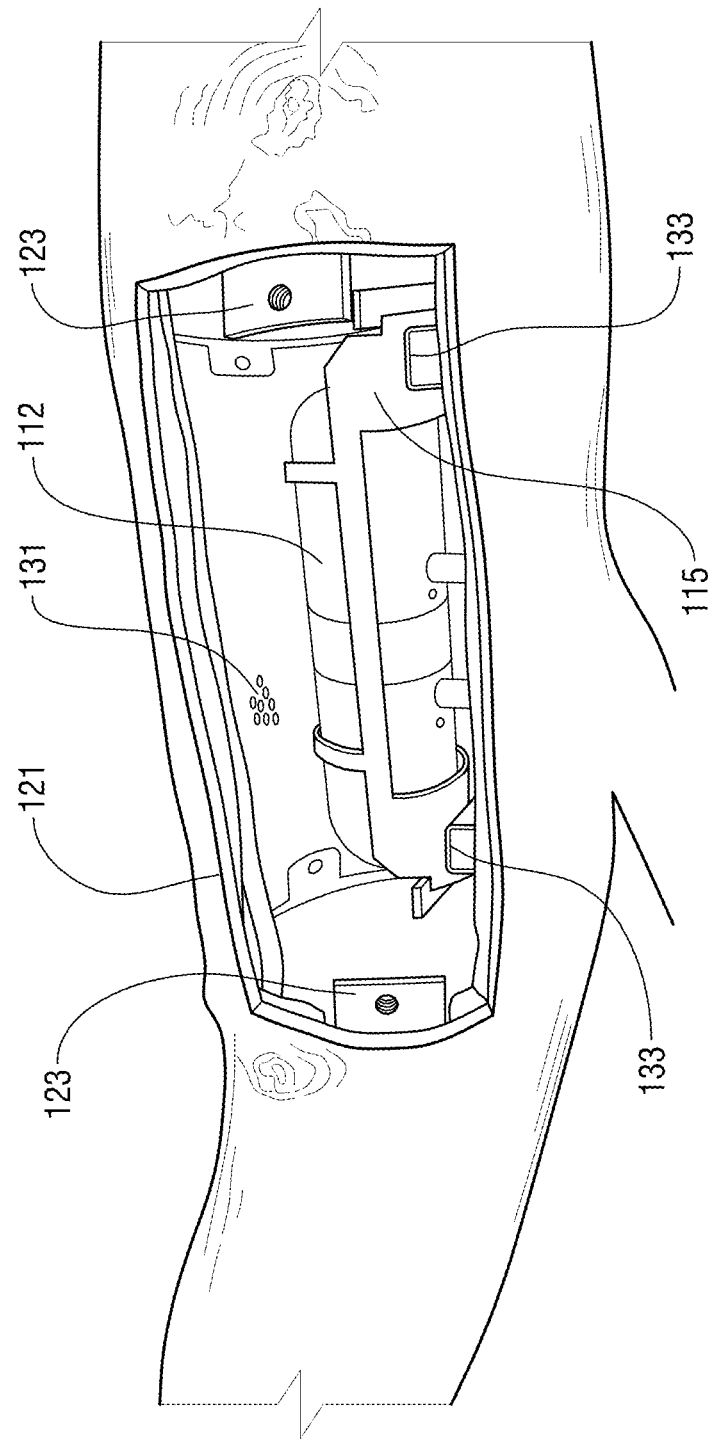
FIG. 12 is a top view of a limb of the tree-shaped housing of one aspect of the present invention showing the speaker location of FIG. 10, but with the speaker access door removed and the speaker installed.

FIGS. 10-14 show various aspects of the speaker system no. The speakers 112 are placed within and supported by a component-supportive structural element, which in this case is a speaker holder 115. The speaker holder 115 is secured within one of the limbs 130, with appropriate power and/or data wiring run to the speakers 112. FIG. 12 shows the speaker holder 115 positioned within the limb 130 ready to be attached. The speaker holder 115 may include various lateral and longitudinal members 116, 117, 118 as are necessary for supporting the speaker 112. The limb 130 is configured with a speaker access hole defined by speaker access hole edges 121 with a corresponding speaker access door 125. The speaker access door 125 provides a closing means for the speaker access hole that is sized to fit with the door edges 129 adjacent to the hole edges 121. Again, the irregularity of the external skin of the tree-shaped housing 101 at the hole edges 121, which abuts the external skin of the tree-shaped housing covering the speaker access door 125, allows the margins of both to be obscured. The speaker access door 125 may be hingedly attached to the edges 121 of the speaker access hole or may be removable and re-attachable. Whether hingedly attached or removably attached, the speaker access door 125 is preferably secured by one or multiple speaker access door securing mechanisms 128 (shown as two screws or bolts in FIG. 10). The speaker access door securing mechanisms 128 may optionally be lockable, but if the speaker access door(s) is positioned high in the upper part of the tree-shaped housing 101, there may be little need to provide a mechanism for locking.

The view in FIGS. 11-12 is looking from the back of limb 130 into the interior of limb 130 with the speaker access door 125 removed. Interior securing brackets 126, 133 are fixedly attached (either permanently or removably) within the interior of limb 130. These securing brackets 126, 133 provide a means by which the speaker holder 115 can be secured within the limb 130. The securing brackets 126, 133 have securing mechanisms configured to receive complementary securing mechanisms on the speaker holder 115. For example, the holes 119 (FIG. 13) may be aligned with corresponding holes within the interior securing brackets 126, and the two pieces may be joined by bolts or screws. The holes in door securing bracket 123 match corresponding holes in speaker access door 125, enabling speaker access door 125 to be secured to the structure via the door securing mechanisms 128. For additional stability, a portion of the securing mechanisms on the speaker access door 125 may be configured with prongs to be inserted into the securing brackets 133.

The camera system 180 may be mounted within the tree kiosk in a similar manner. For example, a component-supportive structural element may be a camera holder installed within the interior of the tree kiosk via a hinged or removable camera access door. Then, the correlating camera system can be installed within or supported by the camera holder with appropriate wiring to connect the camera to the processor 170 and to provide power. Optionally, the camera may be configured to use an Internet or cellular connection to transmit images and/or video to a remote location without using the processor 170 as an intermediary.

Figure 15:
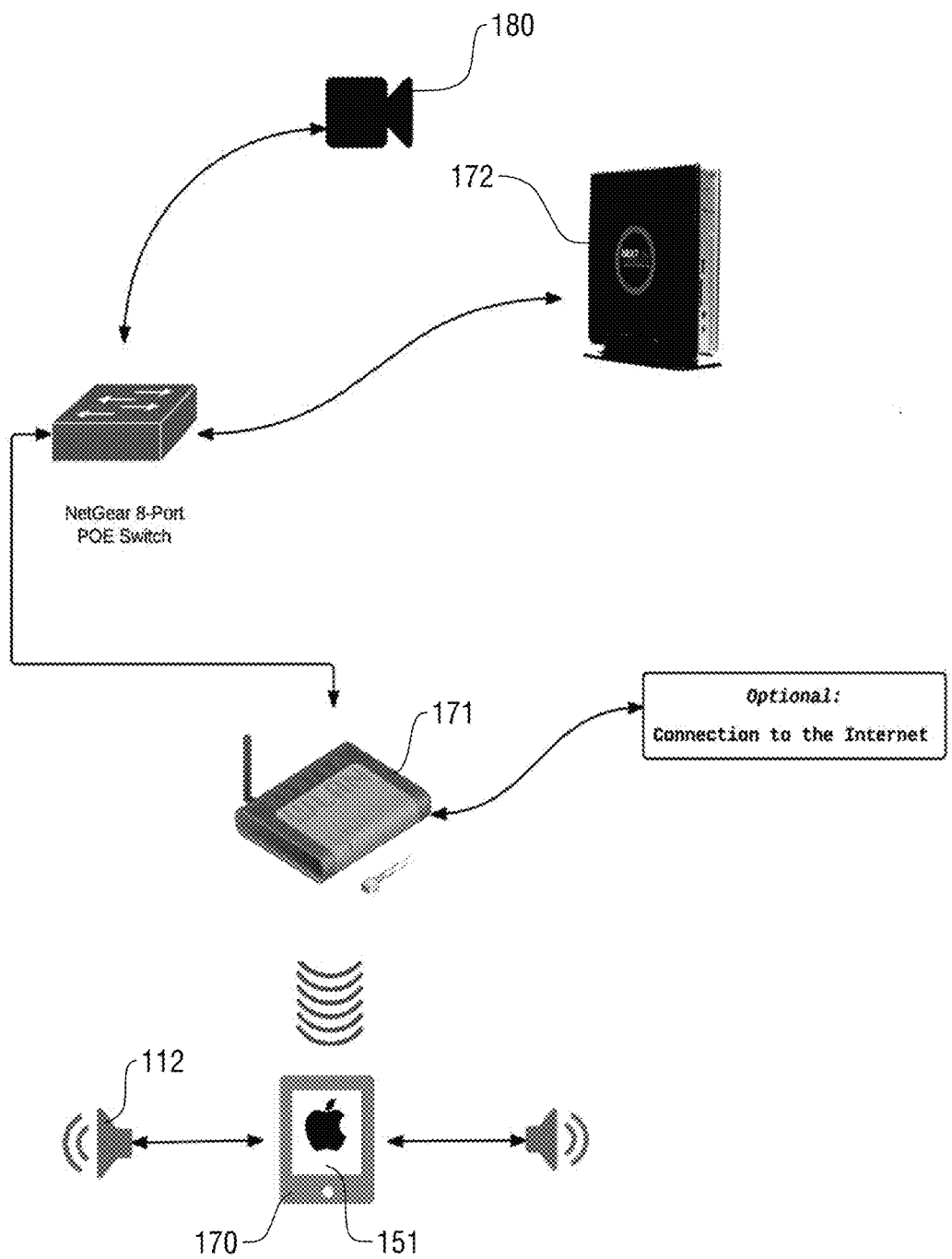
FIG. 15 is a diagram illustrating various components of an exemplary computer system (including processor, peripherals and components) of one aspect of the present invention.
Figure 16:
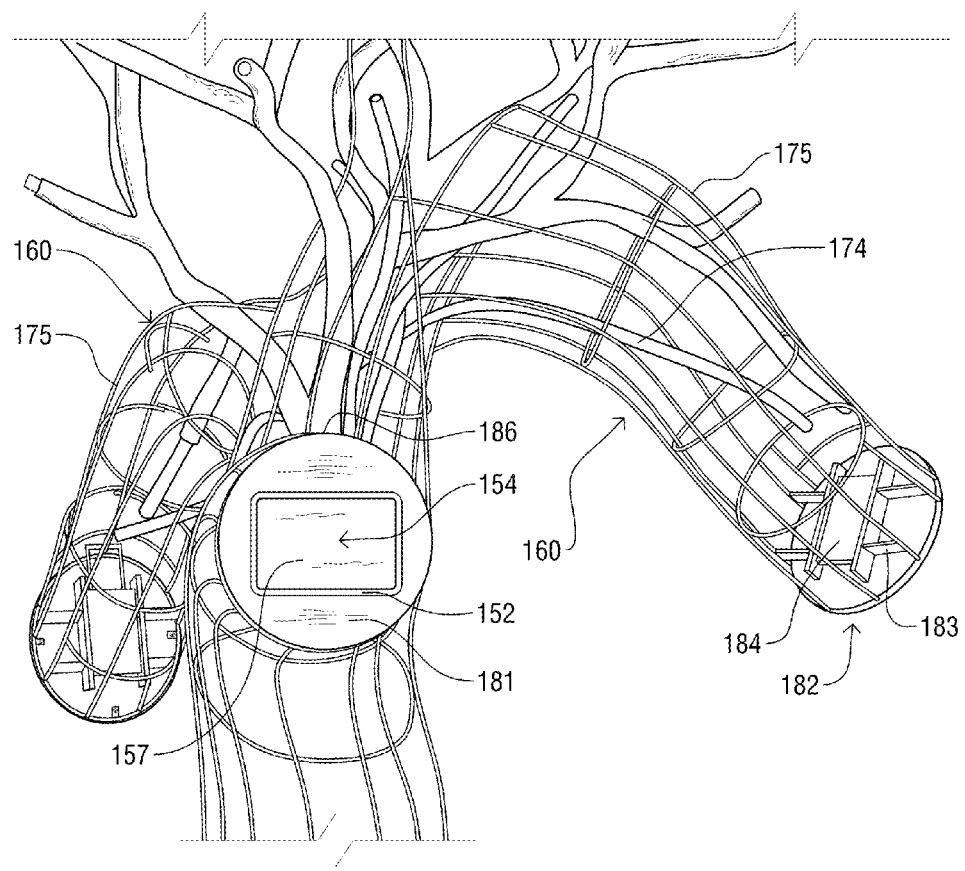
FIG. 16 is front perspective view of a multiple screen aspect of the tree computer kiosk system without the exterior, decorative skin.
Figure 17:
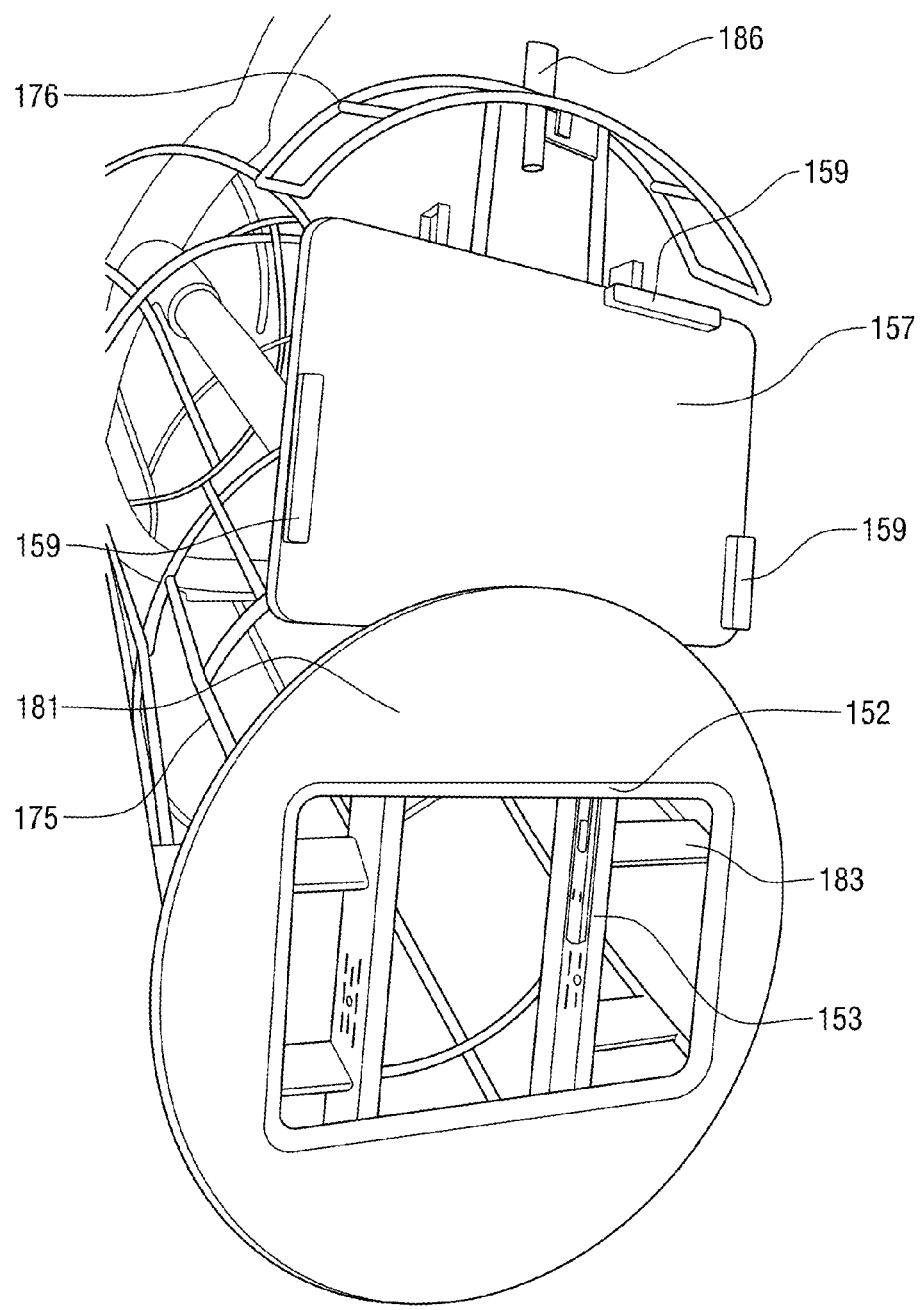
FIG. 17 is front perspective view of the tablet holder portion of an aspect of the tree computer kiosk system without the exterior, decorative skin.
Figure 18:
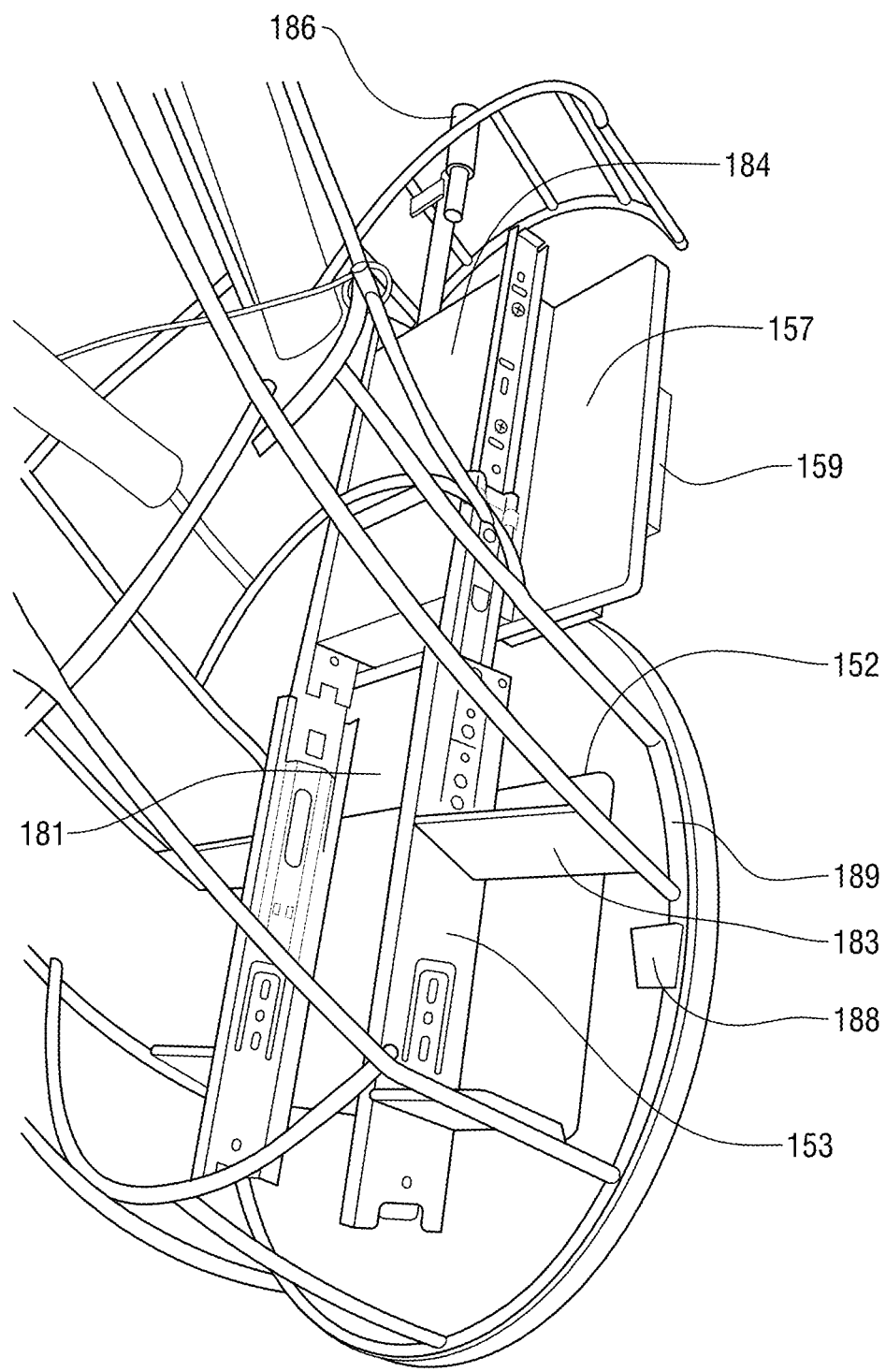
FIG. 18 is back perspective view of the tablet holder portion of an aspect of the tree computer kiosk system without the exterior, decorative skin.

The diagram of FIG. 15 illustrates just one of the many computer systems that can be integrated into the tree-shaped housing 101. The exemplary computer system includes at least one processor 170 and any of a variety of peripherals and electronic components. The peripherals may include any of a number of input devices and output devices. Exemplary input devices include a touch-type display screen 151, a touchpad, scanner, a UPC reader, RFID or NFC reader, memory card reader, flash drive reader, keyboard, a mouse, and camera 180. Exemplary output devices include the display screen 151, audio speakers 112, earphones, earbuds, phone, handset, RFID or NFC writer, memory card writer, flash drive writer, scent dispenser, lighted elements, and a printer. Single or multiple ones of the computer system elements can be provided. For instance, multiple display screens, as illustrated in FIGS. 16-18, can be suspended from the various limb stubs of the tree-shaped housing or rear, side, and front camera lens may be mounted within the camera housing.

Though the computer system is shown in the diagram of FIG. 15 as modular elements, one or more of the elements may be purchased as individual parts and assembled into a computer system within the housing. For example, the processor 170 is shown integrated into a tablet computer in FIG. 15, but the processor 170 may be in the form of a motherboard which is directly integrated into the tree-shaped housing 101 with one or more separate touchscreens that are in signal communication with the motherboard. In a second example, though the display screen is shown as a modular tablet 150, other types of display screens, such as monitors, that are in communication with a separate processor 170 are usable in the tree kiosk 100.

Various electronic components may also be included in the particular computer system to be embedded within the tree-shaped housing 101. For example, a router 171, a POE switch 173, an access control system 172 (such as the NLSS Gateway 500 sold by Next Level Security Systems of Carlsbad, Calif.), a port switch, a modem, a powered or unpowered USB hub, a surge protector, and one or more still or video cameras 180. One or more of the various peripherals or electronic components may be embodied in a fanciful shape that can be associated with the tree-shaped housing 101. For example, two camera lenses could be in the eyes of an owl perched in the tree, or speakers could be positioned in a bird sitting on a limb.

The router 171 may provide wireless or wired connectivity for the other electronic components and processor. Some components may have static IP addresses, while others have DHCP assigned dynamic IP addresses. Optionally, router 171 may provide a connection to the Internet for one or more of the electronic components. This Internet connection may be utilized by remote users of the kiosk (such as to view the video feed from the camera 180 for intrusion detection or to change the output for the speakers 112) or may be utilized by local users of the kiosk (such as to view online webpages on the display screen 151). In addition to (or in substitution for) this Internet-enabled control of the various computer-connected electronic components, one or more of the electronic components may be controlled wirelessly. For example, a wireless connection to the camera system 180 could enable remote operation of the lens 185, or a Bluetooth controller could allow control of speaker volume.

The processor may execute any of a variety of software programs and/or applications, which are referred to generally as "applications." Preferably the applications will have suitable tamper-resistant, visually-pleasing, accessible user interfaces that promote interactivity and ease of use of the system. If Internet access is to be provided, the applications may include at least one appropriate browser. A menu may be provided on the touch-type display screen 151 to allow the local user to select from the available applications. Input screens and virtual buttons may be presented on the screen by the processor 170, or the touch-type display screen 151 may be integrated with nearby physical buttons allowing additional user input. The local user may be provided full, partial, or no control of (or access to) the processor, peripherals and electronic components, but is usually provided with only limited control. For example, if a printer is to be provided for use by the local user, some control of the printer functions will be allowed. However, allowing a local user too much access or control would be detrimental, because the user could crash the system or introduce viruses to the system.

FIG. 16 illustrates a multiple screen aspect of the invention, illustrates that the branch stubs may be angled in any direction that allows a human to interact with the screen, and illustrates another tablet holder aspect. The housing internal support structure 175 is shown without the exterior, decorative skin 179 to facilitate discussion of the internal parts. The structure of the stub 160 is created by the shaping of the housing internal support structure 175, which ends in an internal peripheral frame 189 (FIG. 18), which may be a circumferential or partial circumferential frame. The tablet frame front piece 181 is supported by and attached to this peripheral frame 189, such as by attachment support 188. In the completed kiosk, the internal peripheral frame 189 and the tablet frame front piece 181 will be covered with decorative skin 179.

The stub 160 or stubs 160 may be angled in a number of directions and still be suitable for presenting a tablet in a position and at an angle in which it can serve its designated purpose. This is exemplified in FIG. 16 where one stub 160 is angled upward from the tree base while other stubs 160 are angled downward from a higher location in the tree. In nature, limbs of trees are angled in various directions due to environmental influences or damage. This characteristic variation in limb arrangement and organization is utilized in the design of the multi-screen aspect of the invention to achieve a natural look, while providing a usable height and angle for the desired implementation.

The tablet frame front piece 181 is disposed at the blunt end of the internal support structure 175 of the limb stub. The angle of this tablet frame front piece 181 is the angle of the tablet, when installed. The distance from the floor and the orientation angle of the tablet frame front piece 181 may be selected based on the intended use of the screen 151. For example, the distance from the floor and angle of the tablet frame front piece 181 when the screen 151 will merely be used for displaying a video will likely vary compared to when the planned use includes allowing a user to interact with the screen 151.

FIGS. 16-18 illustrate a second aspect of the tablet support, which is a sliding tablet support 154. The sliding tablet support 154 includes a tablet frame front piece 181, a display screen/tablet hole frame 152, tablet support backing 157 with multiple perimeter stop/restraints 159, a tablet support lock 186, an internal support dissociable portion 176, an extension slide 153, and slide support framing 182 that may include edge-to-edge slide support framing 183 and slide-to-slide support framing 184.

As in the first tablet support aspect that provided a hinged tablet support 155, the sliding tablet support 154 of the second tablet support aspect holds an installed tablet 150 in a viewable position flush within the display screen/tablet hole frame 152. In contrast to the hinged tablet support 155 that rotates around a hinge-defined axis, the sliding tablet support 154 is instead moved by means of an extension slide or glide 153. The extension slide 153, in combination slide support framing 182, 183, 184 allows the sliding tablet support 154 to be moved up or down to allow access to a forward-facing tablet seating area centered on the tablet support backing 157. The extension slide 153 allows the tablet support backing 157 to be manually slid and repositioned from the closed position shown in FIG. 16 to the open, expanded position shown in the front view of FIG. 17 and in the back view of FIG. 18 and back again to the closed position of FIG. 16.

The top of the extension slide 153 is attached to the back of the tablet support backing 157 and a portion of the internal support structure 175 (internal support dissociable portion 176). The bottom of the extension slide 153 is attached to the internal support structure 175 via the slide support framing 182, which may include edge-to-edge slide support framing 183 and/or slide-to-slide support framing 184. Preferably the extension slide 153 comprises a pair of slides, as shown. The extension slide 153 may be any conventional sliding mechanism, such as side-mount or under-mount drawer slides with either a ball-bearing or roller mechanism.

Multiple perimeter stop/restraints 159 are disposed on the outer edges of the tablet support backing 157 to provide a stop or obstruction to prevent the tablet 150 from falling out of the correct position. The multiple perimeter stop/restraints 159 may be perpendicular pieces permanently affixed to or formed integrally with the tablet support backing 157, may be L-shaped bars, or other similar stops as are known in the art.

In the open position, the tablet seating location is accessible within the confines of the multiple perimeter stop/restraints 159 disposed on the outer edges of the tablet support backing 157. The tablet 150 is placed within this tablet seating position against the tablet support backing 157, and the entire sliding tablet support 154 is slid back behind the tablet frame front piece 181 into the closed position, which positions the tablet within the display screen/tablet hole frame 152, and which also repositions the internal support dissociable portion 176 juxtaposed adjacent to the internal support structure 175. When both the internal support dissociable portion 176 and internal support structure 175 are covered with decorative skin 179, this junction is obscured.

The tablet support lock 186 is preferably included to allow securing of the tablet when it is in the position of use. Any conventional lock, which may be keyed or non-keyed, may be used.

The tree trunk 140, a limb stub 160, and limbs 130 are fabricated, meaning that they are assembled from parts or sections and made or constructed by art or skill and human or robotic labor. The materials used include metal, various plastics, fabrics, other manmade materials, and also preserved natural materials (such as preserved natural branches, trunks or leaves). In general, the framing of the trunk may be done with wire with a fabric and/or decorative skin 179 attached to the wire. For outdoor locations or larger trees, a heavier gauge wire and heavier outer fabric may be used than for indoor or smaller trees. The materials may be used with or without coatings or sealants. Coatings may be used to add advantages such as ease of cleaning and fire retardation. For instance, the artificial leaves 127 may be made of polyester fabric, but have a polyurethane coating to repel dust, prevent penetration of the fabric by spills, and enhance cleaning. The fabricated parts may duplicate, copy or replicate something from nature, or they may create an interesting presentation or display that is quite different than that found in nature (for instance, the decorative skin 179 may be formed of metallic fabric or of LED light strands or of LED lights embedded within a fabric base, or the like). In some cases, manmade branches and/or a combination of branches and leaves are used with a manmade fabric-covered wire trunk.

The size of the tree kiosk 100 is sufficient to support at least one tablet 150 which, in general, may be over 6 feet tall. For instance, the entire tree may have a height of 10 feet with an 8-foot diameter canopy, in which case the trunk may have a diameter of from 3 to 5 inches. In another instance, the tree might be an 18-foot tree with a 20-foot diameter canopy with a trunk from 15 to 21 inches in diameter.

The artificial leaves 127 (FIG. 1) are preferably formed of artificial or synthetic materials or of preserved natural materials, but may be formed of unpreserved natural materials. The artificial leaves 127 are fixedly, permanently attached to the limbs 130 (which may include smaller limbs or branches). For example, an artificial leaf 127 may be fixedly attached (by wiring, welding, or adhesively attachment) to smaller limb that has a metal end, with the limb welded to a metal portion of the housing internal support structure 175. The leaves 127 may replicate natural leaves (including various types and colors of natural leaves) or may be fanciful. A fanciful leaf is not a replica of a natural leaf, but is reminiscent of a natural leaf due to its thin structure, size, and/or the placement on branches. For example, a fanciful leaf may be formed of gold or silver metal sheets in a diamond or triangle shape, with the multiple leaves attached in the locations of natural leaves.

Other alternative combinations of materials to be used with the fabricated trunk include artificial branches and/or artificial leaves, preserved natural branches and artificial leaves, or unpreserved natural materials.

The materials and production processes of the components of the tree kiosk 10 may vary based on considerations of size, environment of use, aesthetic desires, and functional requirements. However, in an exemplary production process, the housing internal support structure 175 may be formed of metal (such as steel) piping of appropriate sizes with wire mesh exterior of the inner metal piping.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A computer kiosk, comprising: a tree-shaped housing (101) comprising a trunk (140), at least one limb (130) attached to said trunk (140), and at least one limb stub (160) attached to said trunk (140); a computer system (105) including a processor (170), wherein at least a portion of said computer system (105) is mounted within said tree-shaped housing (101); and a first display screen (151), at least a portion of which is mounted within a first limb stub (160) of said at least one limb stub (160), wherein said first display screen (151) is in communication with said computer processor (170), and wherein said first limb stub (160) comprises a display screen/tablet hole frame (152) through which at least a portion of said first display screen (151) is viewable, wherein said first display screen (151) and said computer processor (170) are integrated into a tablet computer (150), and wherein said first limb (130) comprises a hinged tablet support (155) that accommodates said tablet computer (150).

2. The computer kiosk of claim 1, further comprising:
a second display screen (151), at least a portion of which mounted within a second limb stub (160) of said at least one limb stub (160), wherein said second display screen (151) is in communication with said computer processor (170), and wherein said second limb stub (160) comprises a display screen/tablet hole frame (152) through which at least a portion of said second display screen (151) is viewable.

3. The computer kiosk of claim 1, further comprising:
a camera system (180) in communication with said computer processor (170) and mounted within said tree-shaped housing (101).

4. The computer kiosk of claim 1, further comprising:
audio speakers (112) in communication with said computer processor (170) and mounted within said tree-shaped housing (101).

5. The computer kiosk of claim 1, wherein said tree-shaped housing (101) further comprises an openable access door (125, 165, 191) that provides access to the interior of said tree-shaped housing (101).

6. The computer kiosk of claim 1, wherein said tree-shaped housing (101) further comprises:
an internal support structure (175) forming an internal framework; and
an external decorative skin (179) exterior of said internal support structure (175).

7. The computer kiosk of claim 6, wherein said external decorative skin (179) is formed of a urethane material that imitates the appearance of natural bark.

8. The computer kiosk of claim 6, wherein said tree-shaped housing (101) further comprises at least one camouflaged orifice (124, 131) extending through said external decorative skin (179), wherein said camouflaged orifice imitates an attribute of natural bark in appearance.

9. The computer kiosk of claim 8, further comprising:
an audio speaker (112) mounted within said tree-shaped housing (101) and in communication with said computer processor (170); wherein said audio speaker (112) is mounted behind at least one of said camouflaged orifices (124); and
a camera system (180) having a camera lens, said camera system in communication with said computer processor (170) and mounted within said tree-shaped housing (101), wherein said camouflaged orifice (131) comprises an artificial knothole (124) defined by edges (122) and said camera lens is disposed behind and in alignment with said artificial knothole (124).

10. The computer kiosk of claim 9, further comprising power wiring (198) providing electrical power to interior of said internal support structure (175).

11. The computer kiosk of claim 1, further comprising multiple artificial leaves (127).

12. The computer kiosk of claim 11, wherein said tree-shaped housing (101) further comprises:

an internal support structure (175) forming an internal framework; and
an external decorative skin (179) exterior of said internal support structure (175); and multiple limbs (130) each of which is fixedly attached to said internal support structure (175); wherein each of said multiple artificial leaves (127) is fixedly attached to one of said multiple limbs (130).

13. The computer kiosk of claim 12, wherein said multiple artificial leaves (127) have an appearance of natural leaves.

14. The computer kiosk of claim 12, wherein said multiple artificial leaves (127) comprise fanciful leaves.

15. A computer kiosk, comprising: a tree-shaped housing (101) comprising a trunk (140), at least one limb (130) attached to said trunk (140), at least one limb stub (160) attached to said trunk (140), an internal support structure (175) having an exterior and forming an internal framework, an external decorative skin (179) attached to said exterior of said internal support structure (175), and at least one camouflaged orifice (124, 131) that extends through said external decorative skin (179), wherein said external decorative skin (179) and said camouflaged orifice imitate natural bark in appearance; a computer system (105) including a processor (170), wherein at least a portion of said computer system (105) is mounted within said tree-shaped housing (101); a first display screen (151), at least a portion of which is mounted within a first limb stub (160) of said at least one limb stub (160), wherein said first display screen (151) is in communication with said computer processor (170), and wherein said first limb stub (160) comprises a display screen/tablet hole frame (152) through which at least a portion of said first display screen (151) is viewable; a display screen support (154) disposed within said first limb stub (160) and positioned to support said first display screen (151) in a location viewable through said display screen/tablet hole frame (152), wherein said display screen support (154) is a hinged support; at least one audio speaker (112) in communication with said computer processor (170) and mounted within said tree-shaped housing (101), wherein said tree-shaped housing (101) further comprises an openable access door (125, 165, 191) that provides access to said audio speaker (112) mounted within the interior of said tree-shaped housing (101); and wherein said audio speaker (112) is mounted behind one of said camouflaged orifices (131); a camera system (180) having a camera lens, said camera system in communication with said computer processor (170) and mounted within said tree-shaped housing (101), wherein said camouflaged orifice (131) comprises an artificial knothole (124) defined by edges (122) and said camera lens is disposed behind and in alignment with said artificial knothole (124); power wiring (198) entering said interior of said internal support structure (175) through said openable access door (191); multiple artificial leaves (127); and multiple limbs (130) each of which is fixedly attached to said internal support structure (175); wherein each of said multiple artificial leaves (127) is fixedly attached to one of said multiple limbs (130).

16. The computer kiosk of claim 15, wherein said external decorative skin (179) is formed of a urethane material to imitate the appearance of natural bark.

17. The computer kiosk of claim 15, wherein said multiple artificial leaves (127) replicate natural leaves.

* * * * *